M. D. WELLS.
Hand Seeder.
No. 9,475.
Patented Dec. 14, 1852.
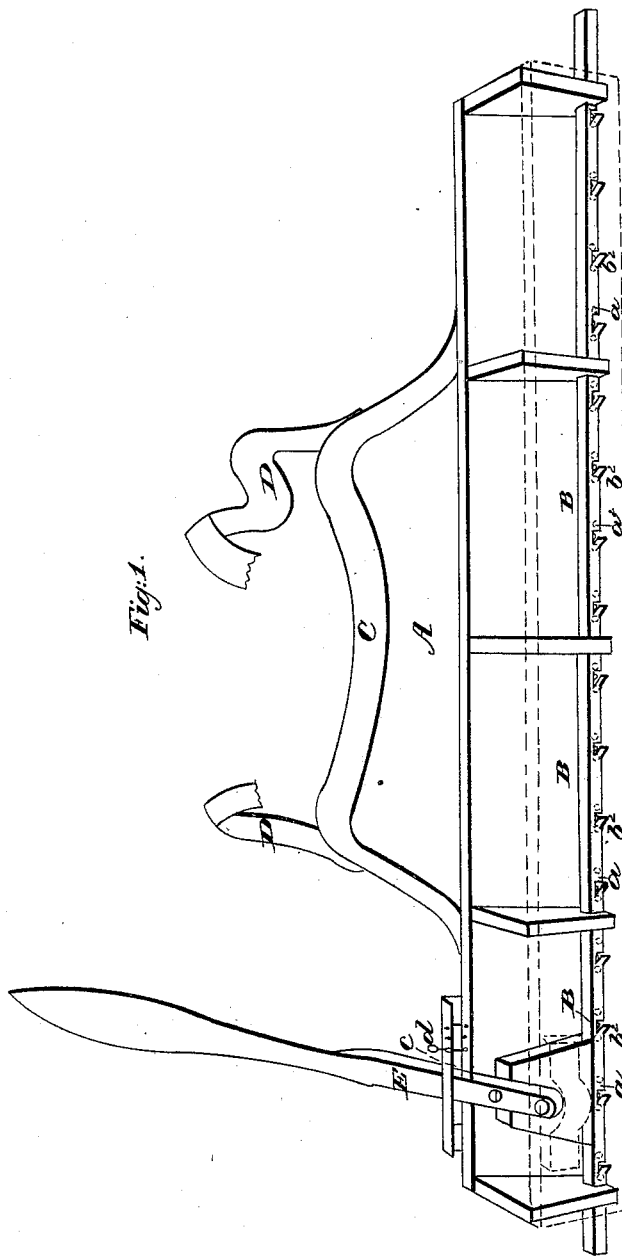
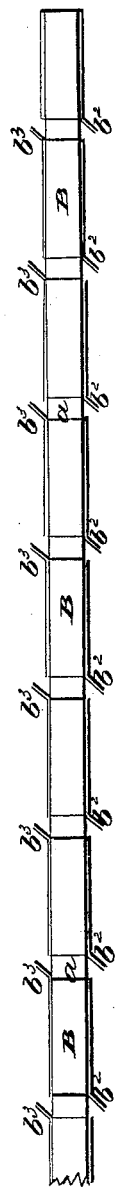

UNITED STATES PATENT OFFICE.

MOSES D. WELLS, OF MORGANTOWN, VIRGINIA.

IMPROVEMENT IN SEED-PLANTERS.

Specification forming part of Letters Patent No. 9,475, dated December 14, 1852.

*To all whom it may concern:*

Be it known that I, MOSES D. WELLS, of Morgantown, in the county of Monongalia and State of Virginia, have invented a new and useful Implement for Sowing Seed; and I do hereby declare that the following is a full, clear, and exact description thereof, reference being had to the annexed drawings and letters of reference marked thereon.

Figure 1 is a perspective view of the entire implement, the front being shown transparent by dotted red lines. Fig. 2 is an inverted plan of a part of the reciprocating feed-bar drawn on a larger scale than Fig. 1.

The same letters occurring in both figures indicate the same parts.

To enable others to make and use my invention, I will proceed to describe its construction and operation.

A is a long narrow trough to contain the seed to be sown.

B is a reciprocating bar, extending through both ends of the box, with recesses $a$ at equal distances in the under side and over a series of holes in the bottom of the trough. Each of these recesses or passages $a$ in the under side of the bar is provided with a wing, $b^2\ b^3$, on each side of the bar, projecting at an angle of about forty-five degrees, those on one side all opening to the left, and on the other all opening to the right, so that as the bar moves back and forth these wings gather the grain or seed toward the holes and insure a regular distribution of the seed.

C is the breast-bar, and D is the collar-strap to suspend the trough (when used as a hand-implement) on a man's neck or round his body.

E is a lever to be worked by hand to slide the feed-bar back and forth, and is worked through a guide-slot, $c$, on top of the trough, the motion of which lever can be regulated by lengthening or shortening said slot by the adjusting-pin $d$. This implement may, however, be used as advantageously for horse-power by mounting the trough on wheels and operating the reciprocating bar by a cam on one of the wheels. I therefore do not intend to limit myself to the use of my invention as a hand implement.

In order that my improvement may be more clearly understood, I will observe that both sides of the reciprocating bar B are furnished with a series of angular wings, $b^2\ b^3$, and these wings project from opposite parallel sides of recesses $a$, formed in the under side of the bar. The use of these angular wings is to gather or concentrate alternately the seed within the recesses $a$—that is to say, the whole series of annular wings $b^2$ on one side of the bar act during the movement of the bar in one direction to draw or concentrate the seed toward the center of the recesses, and on the opposite or return movement of the bar the whole series of angular wings $b^3$ will effect the same result. Thus the seed is drawn or concentrated within the recesses alternately from opposite sides of the bar and discharged by the recesses passing over the apertures in the bottom of the trough independently of the angular wings.

Having now fully explained my improvement, what I claim as new and as my own invention, and desire to secure by Letters Patent, is—

The reciprocating bar B, having wings $b^2\ b^3$ projecting horizontally and obliquely on the front and rear sides of the same to scoop the seeds in the discharge-apertures, arranged and operating in the manner and for the purpose above specified.

In testimony whereof I have hereunto signed my name before two subscribing witnesses.

MOSES D. WELLS.

Witnesses:
HENRY MADERA,
JAMES CHADWICK.